United States Patent
Porte et al.

(10) Patent No.: US 9,567,905 B2
(45) Date of Patent: Feb. 14, 2017

(54) AIRCRAFT NACELLE COMPRISING A REINFORCED CONNECTION BETWEEN AN AIR INTAKE AND A POWERPLANT

(71) Applicant: Airbus Operations (SAS), Toulouse (FR)

(72) Inventors: Alain Porte, Colomiers (FR); Matthieu Fargues, Montauban (FR); Martial Marro, Plaisance du Touch (FR)

(73) Assignee: Airbus Operations (SAS), Toulouse (FR)

( * ) Notice: Subject to any disclaimer, the term of this patent is extended or adjusted under 35 U.S.C. 154(b) by 486 days.

(21) Appl. No.: 14/086,314

(22) Filed: Nov. 21, 2013

(65) Prior Publication Data

US 2014/0144519 A1 May 29, 2014

(30) Foreign Application Priority Data

Nov. 23, 2012 (FR) ...................... 12 61166

(51) Int. Cl.
*F02C 7/04* (2006.01)
*B64D 33/02* (2006.01)
*F01D 21/04* (2006.01)
*F01D 25/24* (2006.01)

(52) U.S. Cl.
CPC ............... *F02C 7/04* (2013.01); *B64D 33/02* (2013.01); *F01D 21/045* (2013.01); *F01D 25/243* (2013.01); *B64D 2033/0286* (2013.01); *F05D 2260/96* (2013.01); *F05D 2300/603* (2013.01); *Y02T 50/672* (2013.01); *Y10T 137/0536* (2015.04)

(58) Field of Classification Search
CPC .... F02C 7/04; B64D 33/02; B64D 2033/0286; F01D 25/243; Y10T 137/0536
See application file for complete search history.

(56) References Cited

U.S. PATENT DOCUMENTS

| | | | | |
|---|---|---|---|---|
| 3,705,688 A | * | 12/1972 | Smale | F02K 1/1207 239/265.39 |
| 4,235,303 A | * | 11/1980 | Dhoore | B64D 33/02 181/214 |
| 5,000,399 A | | 3/1991 | Readnour et al. | |
| 5,623,821 A | * | 4/1997 | Bouiller | B64D 33/02 219/679 |
| 6,123,170 A | * | 9/2000 | Porte | B64D 33/02 181/198 |

(Continued)

FOREIGN PATENT DOCUMENTS

EP 1582702 10/2005
FR 2926791 7/2009

OTHER PUBLICATIONS

French Search Report, Sep. 24, 2013.

*Primary Examiner* — Lorne Meade
(74) *Attorney, Agent, or Firm* — Greer, Burns & Crain, Ltd.

(57) ABSTRACT

An aircraft nacelle comprising a first duct secured to an air intake and a second duct secured to a powerplant, the first duct comprising an exterior surface and an end portion connected to the second duct. The nacelle includes a hollow section piece in contact with the exterior surface of the first duct which extends over at least part of the circumference of that end portion of the first duct that is connected to the second duct.

13 Claims, 4 Drawing Sheets

(56) References Cited

U.S. PATENT DOCUMENTS

| | | | | |
|---|---|---|---|---|
| 6,340,135 B1* | 1/2002 | Barton | ................... | B64D 29/00 |
| | | | | 244/53 B |
| 6,613,258 B1* | 9/2003 | Maison | ............... | B29C 65/7882 |
| | | | | 156/189 |
| 6,743,504 B1* | 6/2004 | Allen | ................... | B29C 70/446 |
| | | | | 428/188 |
| 6,766,984 B1* | 7/2004 | Ochoa | ....................... | B64C 1/12 |
| | | | | 244/119 |
| 7,334,393 B2* | 2/2008 | Porte | ......................... | B64C 7/02 |
| | | | | 60/226.1 |
| 7,975,966 B2* | 7/2011 | De Souza | .............. | B64D 15/04 |
| | | | | 244/134 B |
| 8,333,344 B2* | 12/2012 | Vauchel | ................. | B64D 29/06 |
| | | | | 244/1 N |
| 2005/0218261 A1 | 10/2005 | Porte et al. | | |
| 2006/0145001 A1* | 7/2006 | Smith | ................... | B64D 29/06 |
| | | | | 244/110 B |
| 2009/0309264 A1* | 12/2009 | Cavaliere | ............ | B29C 33/3821 |
| | | | | 264/319 |
| 2010/0320316 A1 | 12/2010 | Vauchel et al. | | |

\* cited by examiner

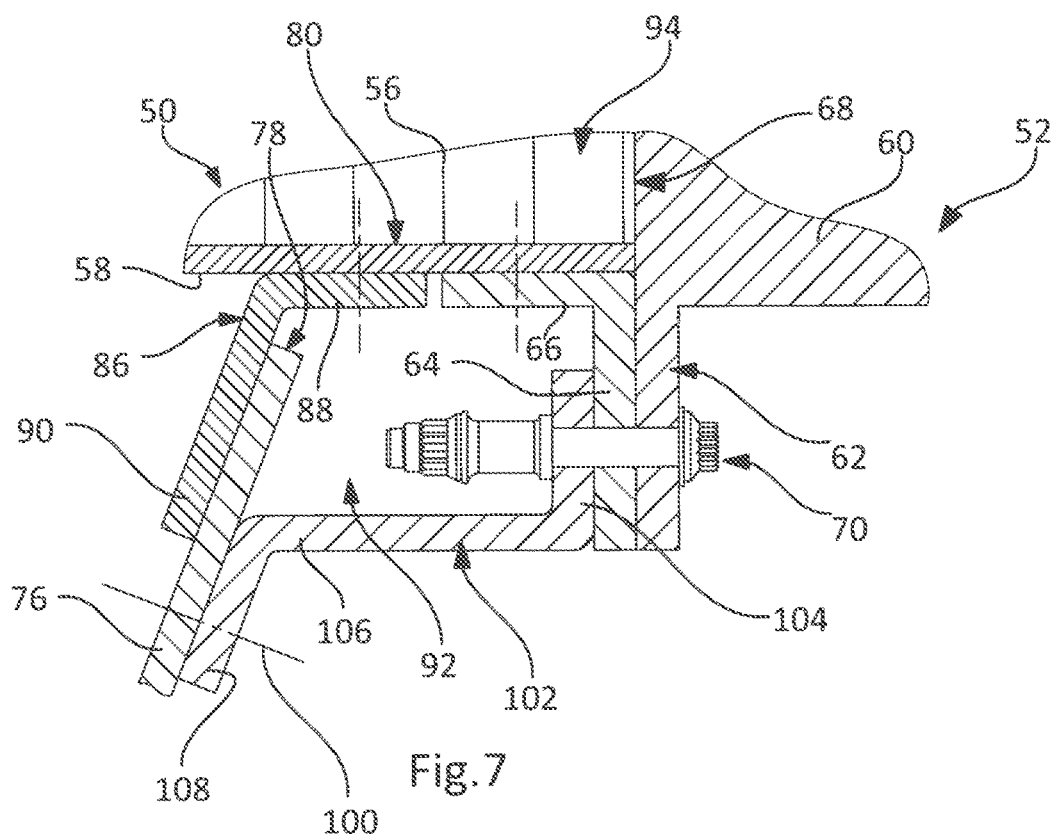
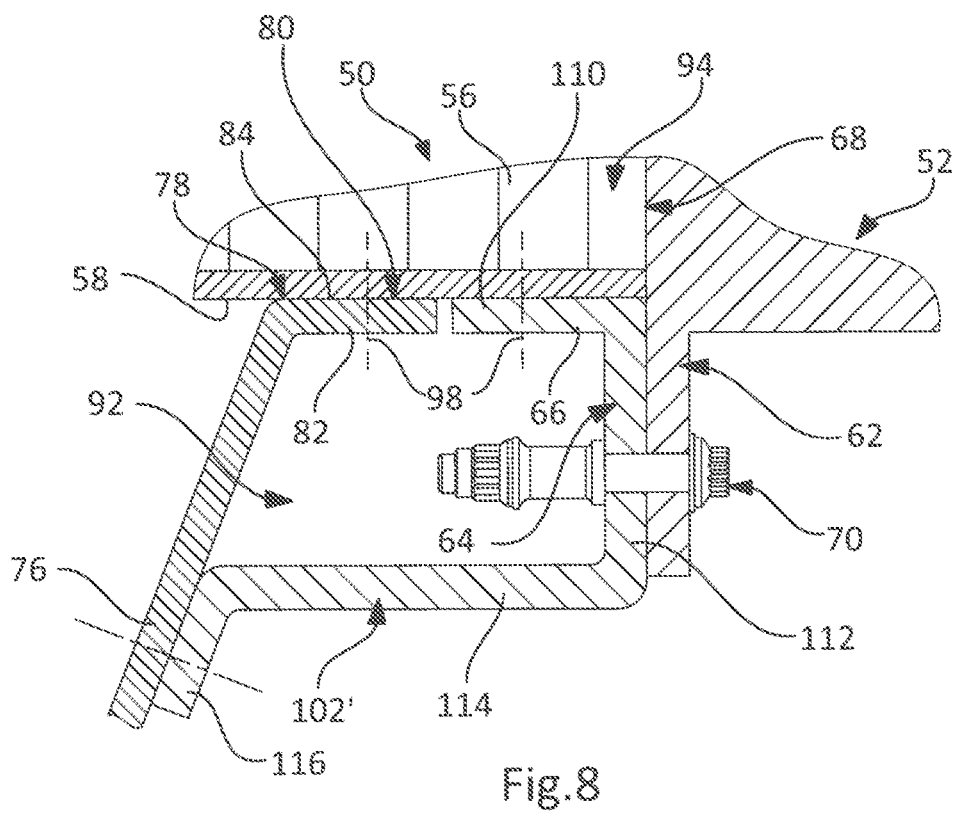

US 9,567,905 B2

AIRCRAFT NACELLE COMPRISING A REINFORCED CONNECTION BETWEEN AN AIR INTAKE AND A POWERPLANT

CROSS-REFERENCES TO RELATED APPLICATIONS

This application claims the benefit of the French patent application No. 20120061166 filed on Nov. 23, 2012, the entire disclosures of which are incorporated herein by way of reference.

BACKGROUND OF THE INVENTION

The present invention relates to an aircraft nacelle incorporating a reinforced connection between an air intake and a powerplant.

An aircraft propulsion unit comprises a nacelle containing, arranged substantially concentrically, a powerplant connected by a pylon to the rest of the aircraft.

As illustrated in FIG. 1, the nacelle comprises at the front an air intake 10 that channels a flow of air towards the powerplant 12, a first part of the incoming air flow, referred to as the primary flow, passing through the powerplant to participate in combustion, the second part of the air flow, referred to as the secondary flow, being driven by a fan and flowing along an annular duct delimited by the interior wall of the nacelle and the exterior wall of the powerplant.

In the remainder of the description, the longitudinal direction corresponds to the direction of the axis of pivoting of the powerplant fan.

The air intake 10 comprises a lip 14 of which the surface in contact with the aerodynamic flows is extended inside the nacelle by an inner duct 16 of substantially circular sections and outside the nacelle by an exterior wall 18 of substantially circular sections. The powerplant comprises a duct 20 that can be positioned in the continuation of the inner duct 16.

As illustrated in FIG. 2, the air intake 10 is connected to the powerplant 12 by a connection which, at the powerplant, comprises a first annular ring flange 22 secured to a second annular ring flange 24 of a panel delimiting the duct 16 or of an intercalated component 26, referred to as a flange, connected to the panel delimiting the duct 16. The two ring flanges 22 and 24 are pressed firmly together at a junction plane 28 substantially perpendicular to the longitudinal direction, and held in this state by connecting elements 30, for example screw fasteners or rivets, which pass through the ring flanges 22, 24 and run parallel to the longitudinal direction.

From a structural standpoint, the air intake 10 comprises a first frame referred to as the front frame 32 connecting the inner duct 16 and the exterior wall 18 delimiting with the lip 14 an annular duct 34 and a second frame referred to as the rear frame 36 connecting the inner duct 16 and the exterior wall 18 near the junction plane 28.

As far as the rear frame is concerned, this reacts the bending forces, rotation forces or other forces applied to the air intake such as, for example, the weight of the air intake, and the loading induced by the aerodynamic flows.

According to one embodiment, the rear frame 36 is connected to the duct 16 directly or via an intercalated component or flange 38 (visible in detail in FIG. 2), one leg of which is connected to the duct 16, the other leg being connected to the rear frame 36.

The rear frame 36 is connected to the exterior wall 18 directly or via a T-section flange 40 (visible in FIG. 1), the rear frame 36 being connected to the upright of the T-section flange, the top of the T resting against the internal face of the exterior wall 18.

According to one embodiment illustrated in document FR-2.904.604, the rear frame comprises a first metal ring, notably made of titanium, which extends over the entire periphery and is connected to the inner duct 16 and a second ring the exterior peripheral edge of which is connected to the exterior wall 18. The first ring at its exterior peripheral edge comprises a zone of overlap with the interior peripheral edge of the second ring. The two rings are joined together by any suitable means in this region of overlap.

In the event of fan blade breakage, the duct 20 of the powerplant has a tendency to deform significantly, this duct being designed to absorb, by deforming, the energy of the broken blades. At the air intake, the inner duct 16 is made of composite material and its mechanical properties are inferior to those of the duct 20 of the powerplant, notably as far as bending strength is concerned.

Hence, in order to limit the risk of dislocation of the panel or panels that make up the inner duct 16 of the air intake, the spread of deformation from the duct 20 of the powerplant towards the inner duct 16 of the air intake needs to be limited.

One first solution is to design a rear frame and/or a connection between the air intake and the powerplant that are capable of deforming in order to absorb some of the energy and thus limit the spread of deformation towards the inner duct 16 of the air intake.

Another solution is to limit the deformation of the inner duct 16 of the air intake by making it more rigid in the zone of connection between the duct of the powerplant. Solutions have been developed for increasing the rigidity of the rear frame and/or of the connection between the air intake and the powerplant.

In order to increase the rigidity of the rear frame, document FR-2.960.856 proposes a reinforced rear frame which comprises a first metal ring the interior edge of which is connected to the interior wall of the air intake and a second ring the exterior edge of which is connected to the exterior wall of the air intake, the two rings being joined together. According to one specific feature of this rear frame, the second ring comprises at least one angular sector made of composite material with at least one box section shape and the first ring comprises a rib running around the entire periphery of the said ring.

To increase the rigidity of the connection between the air intake and the powerplant, one solution is to increase the thicknesses of the ring flanges, to increase the number of connecting elements or the dimensions thereof. However, that solution is unsatisfactory because it does not prevent deformation from occurring between the ring flange 24 and the rest of the inner duct 16 of the air intake, as a bending motion along an axis tangential to the inner duct 16 occurs between the said ring flange and the said duct.

SUMMARY OF THE INVENTION

Hence, the present invention seeks to overcome the disadvantages of the prior art.

To do so, one subject of the invention is an aircraft nacelle comprising a first duct secured to an air intake and a second duct secured to a powerplant, the first duct comprising an exterior surface and an end portion connected to the second duct, characterized in that it comprises a hollow section piece in contact with the exterior surface of the first duct which extends over at least part of the circumference of that end portion of the first duct that is connected to the second duct.

The end portion is defined as the part of the first duct located in the vicinity of the connecting means with the second duct, and rigidly secured to this connecting means.

This solution makes it possible to limit the deformation of the inner duct which is encircled by a rigid element which limits the deformations of the duct.

Advantageously, the hollow section piece is connected to the powerplant and/or to the rear frame. This configuration makes it possible to increase the rigidity of the connection between the air intake duct and the powerplant duct without increasing the number of components, thus tending to reduce the onboard mass and the assembly time.

BRIEF DESCRIPTION OF THE DRAWINGS

Other features and advantages will become apparent from the description which will follow of the invention, which description is given solely by way of example with reference to the attached drawings in which:

FIG. 7 is a view in longitudinal section illustrating in detail a connection between an air intake and a powerplant according to a fourth variant of the invention, and FIG. 8 is a view in longitudinal section illustrating in detail a connection between an air intake and a powerplant according to a fifth variant of the invention.

DETAILED DESCRIPTION OF THE PREFERRED EMBODIMENTS

Figure 1:
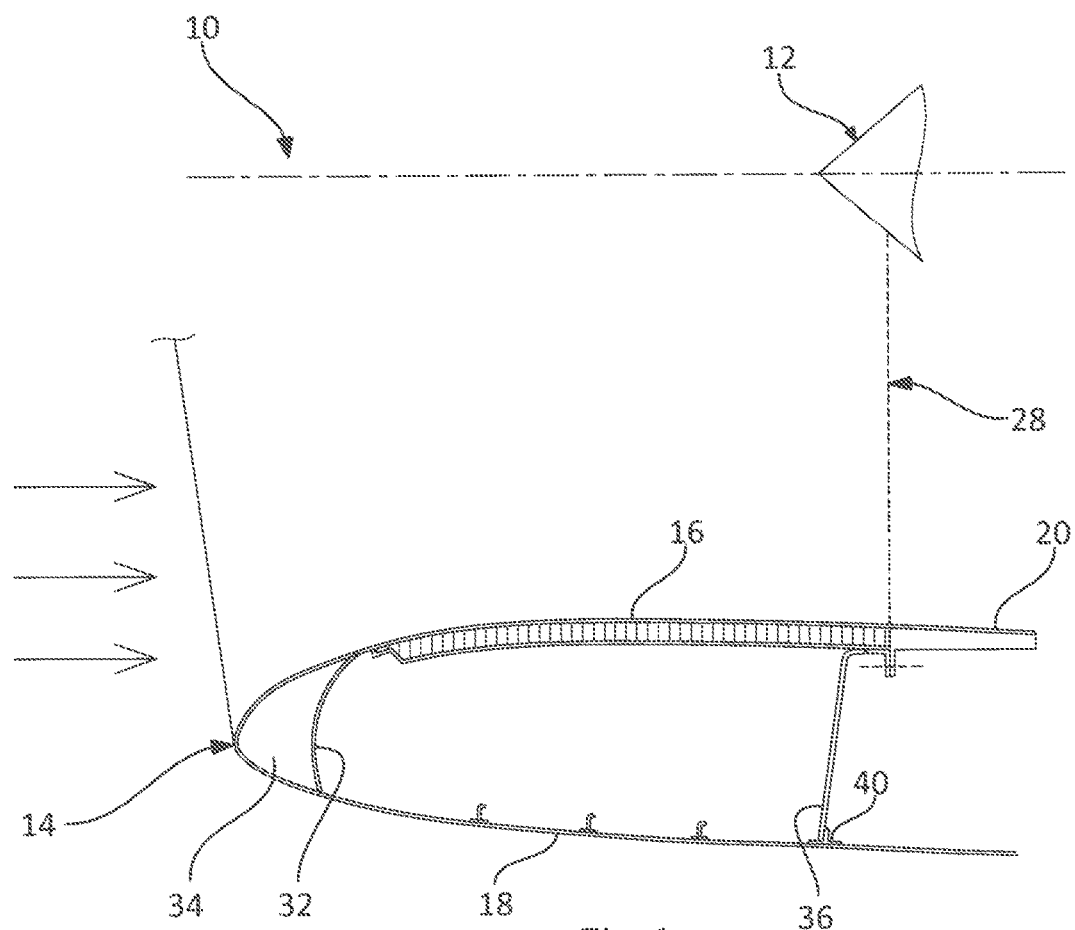
FIG. 1 is a cross section of the lower and front part of a nacelle of an aircraft according to the prior art.
Figure 2:
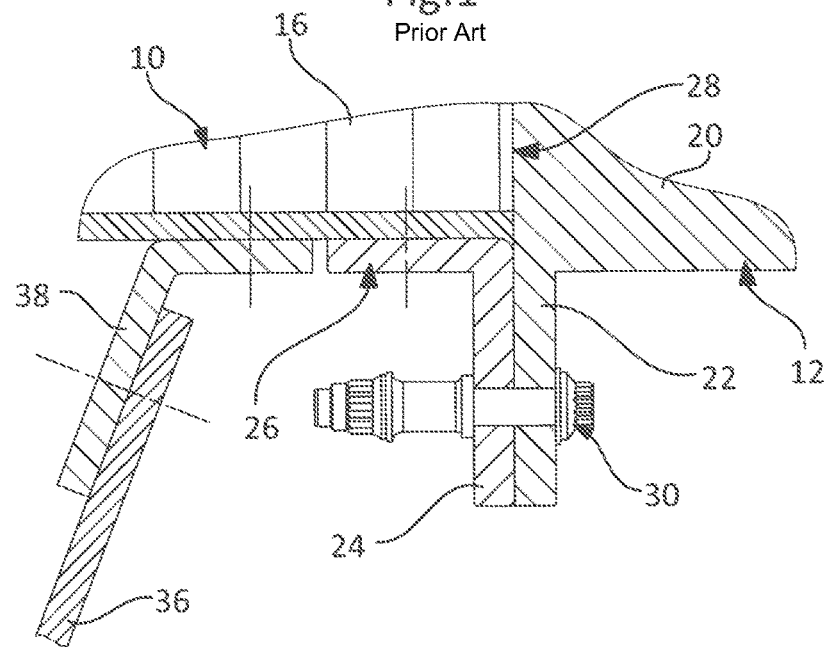
FIG. 2 is a cross section illustrating in detail a connection between an air intake and a powerplant according to the prior art.

FIGS. 3, 5 to 8 depict part of an aircraft nacelle. As in the prior art, it comprises at the front an air intake 50 that channels a flow of air towards a powerplant 52.

The air intake 50 comprises a lip of which the surface in contact with the aerodynamic flows is extended inside the nacelle by an inner duct 56. The powerplant 52 comprises a duct 60 that can be arranged in the continuation of the inner duct 56.

According to one embodiment, the inner duct 56 is delimited by an acoustic treatment panel which comprises, from the centre of the nacelle outwards, an acoustically resistive layer, at least one cellular structure and a reflective layer.

Whatever the embodiment, the inner duct comprises an exterior surface 58.

In the present application, the longitudinal direction coincides with the axis of the powerplant. A longitudinal plane corresponds to a plane containing the longitudinal direction. A transverse plane is a plane perpendicular to the longitudinal direction. A radial direction is a direction perpendicular to the longitudinal direction.

A surface is referred to as exterior if it is oriented towards the outside of the nacelle.

The air intake 50 is connected to the powerplant 52 by a connection which comprises a first annular ring flange 62 in the region of the powerplant and generally a second annular ring flange 64 at the air intake.

Figure 6:
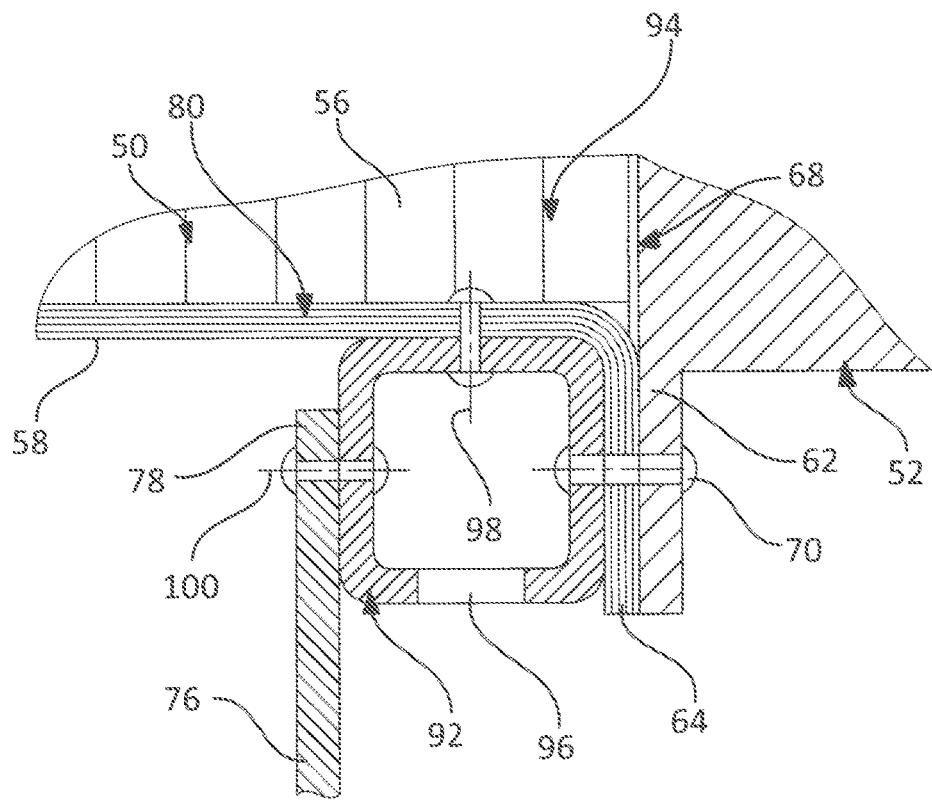
FIG. 6 is a view in longitudinal section illustrating in detail a connection between an air intake and a powerplant according to a third variant of the invention.

According to a first embodiment, this second annular ring flange 64 is produced as one piece with a component that forms at least part of the inner duct 56. As illustrated in FIG. 6, the inner duct 56 comprises a reflective wall in the form of a panel made of composite material the layers of fibers of which make an angle of 90° to form the annular ring flange 64.

Figure 3:
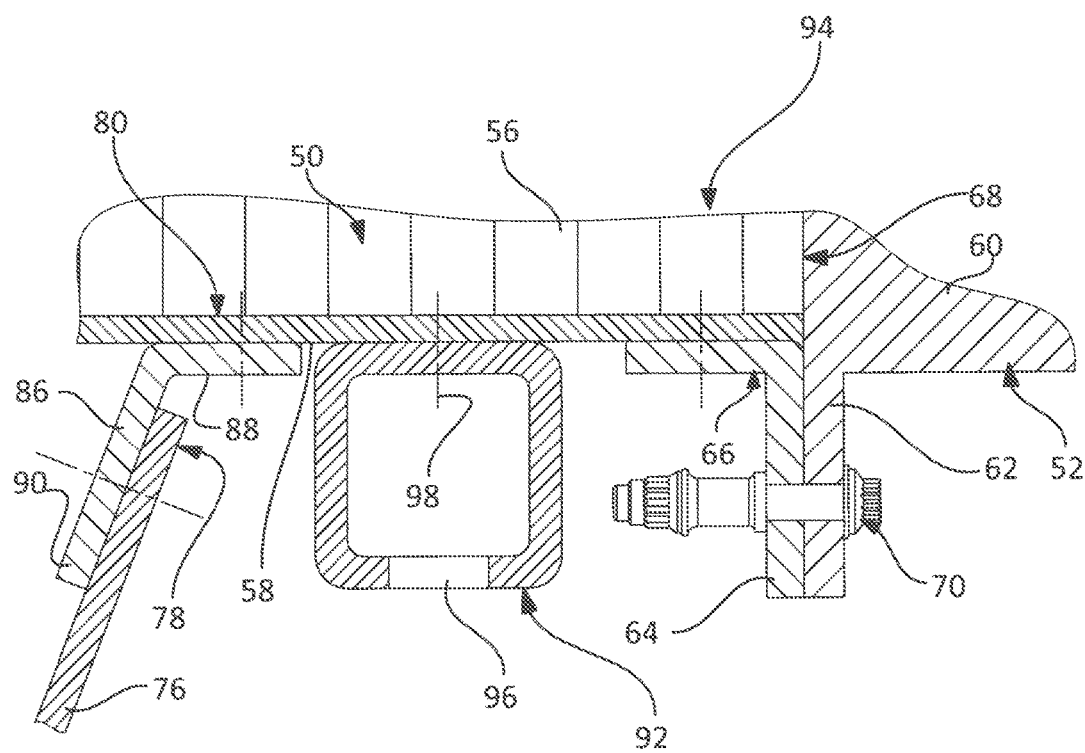
FIG. 3 is a view in longitudinal section illustrating in detail a connection between an air intake and a powerplant according to a first variant of the invention.

According to another embodiment illustrated in FIGS. 3, 7 and 8, the second annular ring flange 64 is a leg of an intercalated component 66, also referred to as a loose flange, connected to a panel that forms the inner duct 56.

Each annular ring flange 64 or 62 runs in a plane substantially perpendicular to the longitudinal direction.

The inner duct 56 comprises an end portion 94 pressed firmly against an end of the duct 60 of the powerplant in the region of a junction plane 68 substantially perpendicular to the longitudinal direction, and held in that state by connecting elements 70, for example by screw fasteners or rivets, which run parallel to the longitudinal direction and are distributed about the circumference of the two ducts 56 and 60.

According to one known embodiment, the connecting elements 70 pass through the annular ring flanges 64 and 62 and keep them pressed firmly together.

The connecting elements 70 are not detailed further because they may be identical to those of the prior art and set out in the same way.

From a structural standpoint, the air intake 50 comprises a first frame referred to as the front frame (not depicted) and a second frame referred to as the rear frame 76 connecting the exterior wall of the nacelle and the inner duct 56 in the region of a junction zone 80 near the end portion 94.

According to one embodiment, the rear frame 76 takes the form of a ring made in one or several pieces, from the same material or otherwise. As the case may be, the rear frame 76 may take the form of a plate that is planar or that has roughnesses, such as ribs for example.

The rear frame 76 comprises an interior peripheral edge 78 connected directly or otherwise to the inner duct 56 and an exterior peripheral edge connected directly or otherwise to the exterior wall.

According to one embodiment illustrated in FIG. 8, the rear frame 76 is connected directly to the duct 56. In that case, the rear frame comprises an interior rim 82 offering a seating surface 84 pressed firmly against the exterior surface 58 of the inner duct 56. The interior rim 82 is connected to the inner duct 56 by suitable means of connection, for example by screw fasteners, studs, rivets or the like.

According to another embodiment illustrated in FIGS. 3 and 7, the rear frame 76 is connected to the inner duct 56 by an intercalated component 86 referred to as a loose flange. The latter comprises a first leg 88 pressed firmly and fixed against the inner duct 56 by suitable means of connection, for example screw fasteners, studs, rivets or the like, and a second leg 90 pressed firmly and fixed against the rear frame 76 by suitable means of connection, for example screw fasteners, studs, rivets or the like.

The connection between the rear frame 76 and the exterior wall is not detailed further because it may be identical to the prior art.

According to the invention, the nacelle comprises a hollow section piece 92 in contact with the exterior surface 58 of the inner duct 56 which extends over at least part of the circumference of the end portion 94 of the inner duct 56.

A hollow section piece here means an element that may be made up of one piece or of various pieces which forms/form a closed contour in a longitudinal plane. This hollow section piece provides a high moment of inertia/mass ratio which, for the same mechanical strength, means that the onboard mass carried can be reduced.

Figure 4:
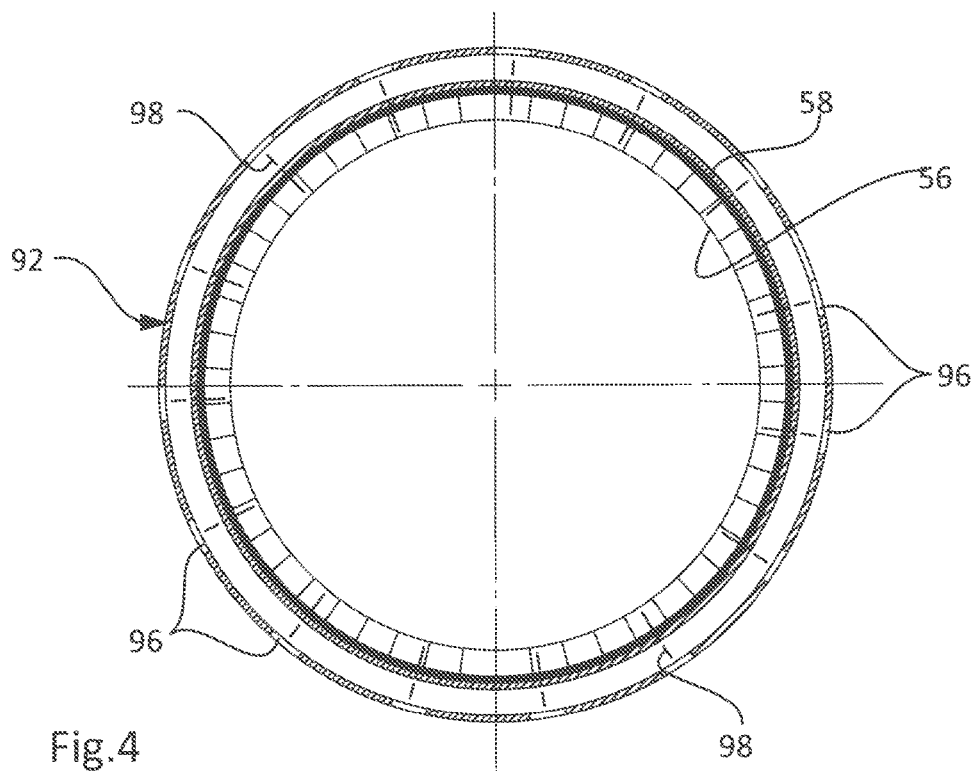
FIG. 4 is a cross section of an air intake inner duct that has been reinforced according to the first variant of the invention.

This hollow section piece 92 may have openings 96 as illustrated in FIGS. 3 and 4.

Advantageously, this hollow section piece 92 is fixed to the inner duct 56 by connecting elements 98, such as blind rivets for example. The openings 96 are positioned in line with the connecting elements 98 and allow the said connecting elements 98 to be fitted.

According to a preferred embodiment illustrated in FIG. 4, the hollow section piece 92 extends over the entire circumference of the inner duct 56 so as to encircle it. In such an instance, the hollow section piece 92 may be made up of several hollow section pieces placed end to end and joined together. As an alternative, the hollow section piece may be made as a single piece. Advantageously, the connecting elements 98 are distributed evenly over the entire circumference of the inner duct 56.

Preferentially, the hollow section piece extends over the end portion of the inner duct, intercalated between the connecting means with the second duct and the connecting zone 80 that connects the rear frame 76 and the inner duct 56. This end portion of the inner duct is rigidly secured to the connecting means with the second duct.

According to one embodiment, the hollow section piece 92 has a square or rectangular section one side of which is pressed firmly and fixed against the exterior surface 58 of the inner duct 56.

Figure 5:
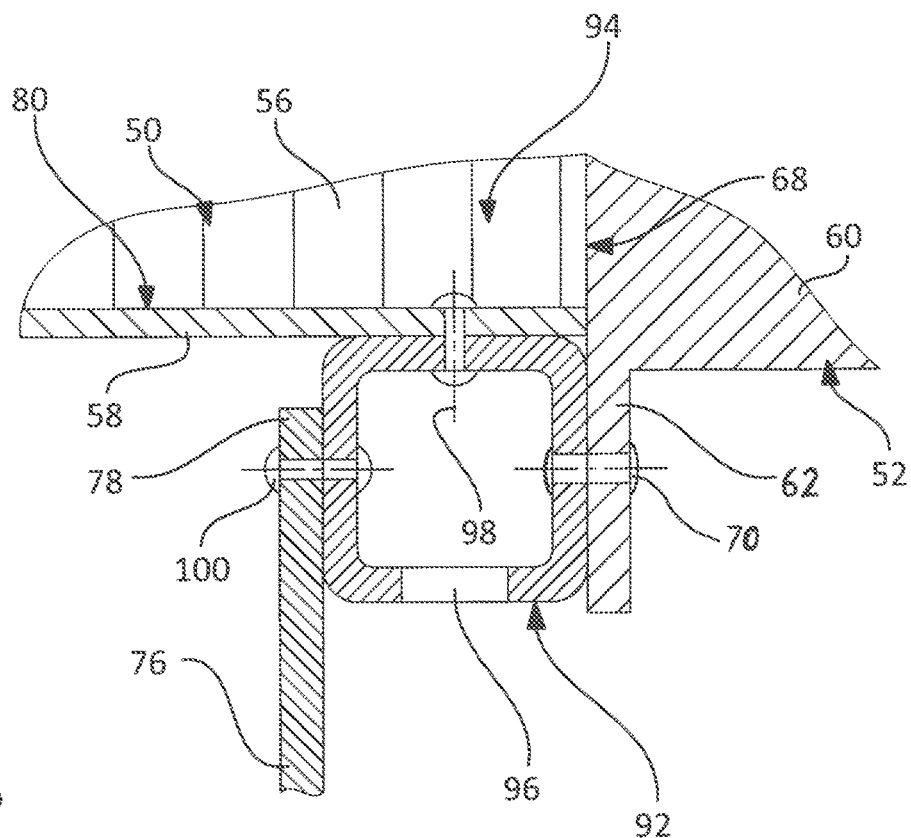
FIG. 5 is a view in longitudinal section illustrating in detail a connection between an air intake and a powerplant according to a second variant of the invention.

Advantageously, the hollow section piece 92 is pressed firmly and fixed against the annular ring flange 64 or the ring flange 62, as illustrated in FIGS. 5 and 6. This solution makes it possible to limit bending deformation between, on the one hand, the inner duct 56 and the connection between the air intake and the powerplant.

The connecting elements 70 used to make the connection between the air intake and the powerplant can be used to join the hollow section piece 92 to one or both of the ring flanges.

According to a variant illustrated in FIG. 6, the hollow section piece 92 is pressed firmly against the annular ring flange 64. This solution is more particularly suited to situations in which the reflective wall of the inner duct is made from layers of fibers. In such instances, the hollow section piece 92 has rounded corners. Thus, the layers of fibers follow the rounded profile of the hollow section piece 92. This configuration makes it possible to limit the bending of the layers of fiber.

According to other variants illustrated in FIGS. 5, 7 and 8, the hollow section piece 92 may replace the annular ring flange of the air intake. When it does, the annular ring flange 62 of the powerplant is fixed using the connecting elements 70 directly to the hollow section piece 92 which is itself connected to the inner duct 56 by the connecting element 98.

Advantageously, the rear frame 76 is connected to the hollow section piece 92 using connecting elements 100, as illustrated in FIGS. 5 and 6. In this variant, the hollow section piece 92 may or may not be pressed firmly against the annular ring flange 64 or the annular ring flange 62.

When the hollow section piece 92 is pressed firmly against an annular ring flange and connected to the rear frame 76, the openings 96 allow the fitting of the connecting elements 70, 98 and 100.

According to simplified variants illustrated in FIGS. 3, 5 and 6, the hollow section piece 92 has sections in longitudinal planes that are obtained as one piece.

According to other variants illustrated in FIGS. 7 and 8, the hollow section piece 92 has sections in longitudinal planes that are obtained from several pieces joined together.

According to these variants, the nacelle comprises a reinforcement 102 which connects the rear frame 76 and the connecting zone connecting the intake and the powerplant.

According to a variant illustrated in FIG. 7, the reinforcement 102 is separate from the annular ring flange 64 and has a Z-section profile. In longitudinal planes, it comprises a first part 104 which is pressed firmly against the second annular ring flange 64 and connected thereto using the connecting elements 70, an intermediate second part 106 which is distant from the inner duct 56 and substantially parallel to the longitudinal direction, and a third part 108 which is pressed firmly against the rear frame 76 and connected thereto by any appropriate means of connection. According to this variant, the hollow section piece 92 is formed of the reinforcement 102, the flange 66 which forms the annular ring flange 64, the inner duct 56, the flange 88 which makes the connection between the rear frame 76 and the inner duct 56, and the rear frame 76. In another embodiment, the inner duct 56 comprises a reflective wall in the form of a panel made of composite material the layers of fibers of which make an angle of 90° in order to form the annular ring flange 64.

According to another variant illustrated in FIG. 8, the reinforcement 102' performs the flange 66 function of the preceding variant. In this case, the reinforcement 102' comprises a first part 110 fixed to the inner duct 56, a second part 112 which performs the annular ring flange function and is connected to the annular ring flange 62 of the powerplant by the connecting elements 70, a third part 114 distant from the first part 110 and substantially parallel to the longitudinal direction, and a fourth part 116 pressed firmly against the rear frame 76 and connected thereto by any suitable means of connection.

According to this variant, the hollow section piece 92 is formed by the reinforcement 102', the inner duct 56 and the rear frame 76.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft nacelle comprising:
a first duct extending from an air intake of the aircraft nacelle to an end portion with a first duct annular ring flange extending away from an exterior surface of the first duct;
a second duct surrounding a powerplant and having a first end including a second duct annular ring flange fastened to the first duct annular ring flange, wherein the first duct annular ring flange and the second duct annular ring flange both run in planes that are substantially perpendicular to a longitudinal direction;

a hollow section piece connected to the exterior surface of the first duct, the hollow section piece extending over at least part of a circumference of the end portion of the first duct, and wherein the hollow section piece comprises a longitudinal cross section that is a hollow rectangle or a hollow square;

a rear frame fastened to the exterior surface of the first duct and, wherein the hollow section piece is connected to the exterior surface of the first duct between the rear frame and the first duct annular ring flange.

2. The aircraft nacelle according to claim 1, wherein the rear frame connects an exterior wall of the nacelle and the first duct at a junction zone near the end portion, wherein the hollow section piece is intercalated between the junction zone and the second duct.

3. The aircraft nacelle according to claim 1, wherein the hollow section piece is fixed to the first duct by connecting elements.

4. The aircraft nacelle according to claim 1, wherein the hollow section piece extends over the entire circumference of the first duct so as to encircle it.

5. The aircraft nacelle according to claim 1, wherein the hollow section piece has sections in longitudinal planes made as a single piece.

6. The aircraft nacelle according to claim 5, wherein the hollow section piece has rounded corners.

7. The aircraft nacelle according to claim 1, wherein the hollow section piece is spaced from the second duct annular ring flange of the powerplant.

8. The aircraft nacelle according to claim 1, wherein the annular ring flanges extend in transverse planes and are kept pressed firmly against one another by connecting elements.

9. The aircraft nacelle according to claim 1, wherein the rear frame is spaced from the hollow section piece.

10. The aircraft nacelle of claim 1 further comprising:

a loose flange securing the exterior surface of the first duct to the rear frame, the loose flange comprising a first leg fixed against the exterior surface of the first duct and a second leg connected to the rear frame.

11. The aircraft nacelle of claim 10 wherein the hollow section piece is disposed on the exterior surface of the first duct between the first duct annular ring flange and the loose flange.

12. An aircraft nacelle comprising:

a first duct extending from an air intake of the aircraft nacelle to an end portion with a first duct annular ring flange extending away from an exterior surface of the first duct;

a second duct surrounding a powerplant and having a first end pressed against the end portion of the first duct, and the first end of the second duct including a second duct annular ring flange fastened to the first duct annular ring flange, wherein the first duct annular ring flange and the second duct annular ring flange both run in planes that are substantially perpendicular to a longitudinal direction;

a hollow section piece connected to the exterior surface of the first duct, the hollow section piece extending over at least part of a circumference of the end portion of the first duct; and, a rear frame fastened to the exterior surface of the first duct, wherein the hollow section piece is disposed between the rear frame and the first duct annular ring flange along the longitudinal direction, and the hollow section piece not in direct contact with either the rear frame or the first duct annular ring flange.

13. An aircraft nacelle comprising:

a first duct extending from an air intake of the aircraft nacelle to an end portion with a first duct annular ring flange extending away from an exterior surface of the first duct;

a second duct surrounding a powerplant and having a first end pressed against the end portion of the first duct, and the first end of the second duct including a second duct annular ring flange fastened to the first duct annular ring flange, wherein the first duct annular ring flange and the second duct annular ring flange both run in planes that are substantially perpendicular to a longitudinal direction;

a hollow section piece connected to the exterior surface of the first duct, the hollow section piece extending over at least part of a circumference of the end portion of the first duct;

a rear frame fastened to the exterior surface of the first duct; and, a loose flange securing the exterior surface of the first duct to the rear frame, the loose flange comprising a first leg fixed against the exterior surface of the first duct and a second leg connected to the rear frame and wherein the hollow section piece is disposed on the exterior surface of the first duct between the first duct annular ring flange and the loose flange.

* * * * *